United States Patent [19]

Tsuji et al.

[11] Patent Number: 4,862,443
[45] Date of Patent: Aug. 29, 1989

[54] SYNC SIGNAL DETECTION APPARATUS FOR ACCURATELY SYNCHRONIZING REPRODUCED DATA

[75] Inventors: Kentaroh Tsuji, Nara; Shigemi Maeda, Yamatokoriyama; Takeshi Yamaguchi, Tenri; Toshihisa Deguchi, Nara; Noriaki Sakamoto, Kyoto; Shigeo Terashima, Tenri, all of Japan

[73] Assignee: Sharp Kabushiki Kaisha, Osaka, Japan

[21] Appl. No.: 19,707

[22] Filed: Feb. 27, 1987

[30] Foreign Application Priority Data

Feb. 28, 1986 [JP] Japan .................................. 61-45759

[51] Int. Cl.⁴ .......................... H04L 7/06; G11B 5/09; H03M 5/00
[52] U.S. Cl. ....................................... 369/59; 360/39; 360/41; 360/48; 375/108; 375/113
[58] Field of Search .............................. 360/39, 41–48, 360/49, 37.1, 51, 36.2, 53, 40; 369/59; 358/148; 375/110, 108, 113

[56] References Cited

U.S. PATENT DOCUMENTS

| | | | |
|---|---|---|---|
| 3,947,878 | 3/1976 | McGrath et al. | 360/51 |
| 4,275,466 | 6/1981 | Yamamoto | 360/51 X |
| 4,697,167 | 9/1987 | O'Keeffe et al. | 360/40 X |

Primary Examiner—Robert L. Richardson
Attorney, Agent, or Firm—Birch, Stewart, Kolasch, & Birch

[57] ABSTRACT

A sync signal detection apparatus is provided wherein a sync signal represents the top of recorded data. The sync signal includes a plurality of marks each having a different pattern from the pattern of any other mark. The apparatus is equipped with a circuit for sequentially detecting the patterns of the individual marks in a reproduction mode. Also, a circuit is provided generating a sync pulse at the top of the data in accordance with the address pattern of the mark after a predetermined number of marks are detected. The apparatus ensures accurate reproduction of the recorded data with a small number of bits and an increase in data reliability.

3 Claims, 20 Drawing Sheets

SYNC PATTERN
(a) 1 0 0 0 1 0 0 0 1

(b)
ADDRESS PATTERN
① 1 1 0 0 1 1 —
② 0 1 0 0 1 1 —
③ 1 0 1 0 0 1 —
④ 0 0 1 0 0 1 —

MARK I    1 0 0 0 1 0 0 0 1 1 0 0 1 1

MARK II   1 0 0 0 1 0 0 0 1 0 1 0 0 1 1

MARK III  1 0 0 0 1 0 0 0 1 1 0 1 0 0 1

MARK IV   1 0 0 0 1 0 0 0 1 0 0 1 0 0 1

SYNC SIGNAL DETECTION APPARATUS FOR ACCURATELY SYNCHRONIZING REPRODUCED DATA

BACKGROUND OF THE INVENTION

1. Field of the Invention

The embodiments of the present invention relates to detection of a sync signal in a magnetic recorder, an optical recorder or a similar device.

2. Description of the Prior Art

In the conventional machine for recording and reproducing data from a recording medium, the recording medium is customarily formatted as shown in FIG. 2. In this diagram, SM (sector mark) is a signal representing the top of a sector; VFO SYNC is a clock signal for locking in a PLL circuit; ID is a signal of positional information relative to a track number, a second number and so forth; and SYNC is a signal representing the top of data.

Each track on the recording medium is divided into a predetermined number a of sectors as shown in FIG. 2(a), and each sector is so formated as shown in (b). Such a sector is used as a unitary region when data is recorded. For reading out the data 12 recorded in the sector, a PLL circuit is initially activated by a VFO SYNC 10 recorded in the sector, and a read clock for data 12 is generated. Subsequently, a SYNC signal 11 recorded in the sector is detected in response to a read clock which generates a sync pulse representing the top of data 12, so that the next circuits (demodulation circuit and so forth) to read out data 12 are set. However, in such a conventional read system, some drawbacks exist so that proper demodulation is not attainable when the sync signal is not detected with accuracy, which directly causes an increase of the error rate.

SUMMARY OF THE INVENTION

The embodiments of the present invention have been accomplished in an attempt to solve the problems mentioned above. The object resides in realizing an exact detection for the sync signal.

Briefly described, in accordance with the embodiments of the present invention, a a sync signal employed to represent the top of recorded data is composed by a plurality of marks each having a pattern portion different from the corresponding portion of any other mark. The sync signal detection apparatus is equipped for sequentially detecting the patterns of the individual marks in a reproduction mode and for generating a sync signal at the top of data in response to the address pattern thereof when a predetermined number of marks are detected.

BRIEF DESCRIPTION OF THE DRAWINGS

The embodiments of the present invention will become more fully understood from the detailed description given hereinbelow and the accompanying drawings which are given by way of illustration only, and thus are not limitative of the present invention and wherein:

FIGS. 5(a) through 5(i) and 6(a) through 6(i) depict Tables 1 and 2 which show codes employed in the modulation system of the present invention.

DESCRIPTION OF THE PREFERRED EMBODIMENT

Hereinafter an exemplary embodiment of a sync signal detection apparatus according to the present invention will be described with reference to the accompanying drawings.

Tables 1 and 2 show codes of a NRZI (non-return to zero inverted) modulation system in a sync signal detection apparatus for an embodiment of the invention.

In any magnetic recorder where audio signals are processed by pulse code modulation and a recording operation is performed by the use of a rotary head without forming a guard band, a low-frequency component is cut off due to the differential output characteristic of magnetic recording. Also, a rotary transformer and the low-frequency crosstalk from an adjacent track cuts off the low-frequency component, so that a failure problem in achieving high-fidelity reproduction of the low-frequency component exists.

Accordingly, in such an apparatus where the recording/reproducing frequency band is narrow and the low-frequency component needs to be minimized, the record signal is effectively processed by a modulation system in which the frequency spectrum component is small in low-frequency and DC areas. One of the preferred modulation systems is NRZI which causes a signal inversion at "1" but no inversion at "0" for a data signal.

In this embodiment, 8 pre-modulation bits m and 10 post-modulation bits n are employed, wherein a maximum inversion width Tmax is set to be 4T' (in which T' = the minimum inversion width Tmin = the detection window width Tw), and 4T' is not continuous. In a recording mode, an NRZI (non-return to zero inverted) system is adopted where a signal is inverted at "1" but the signal is not inverted at "0". In Tables 1 and 2, Q' and Q respectively denote direct-current storage data of a preceding-position code and a present-position code, and DC denotes a direct current component.

Figure 2:
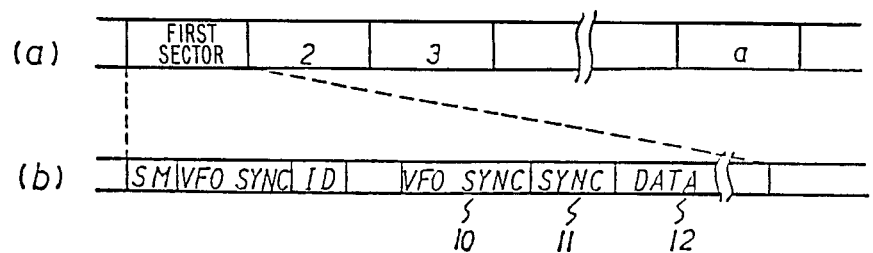
FIGS. 2, (a) and (b), illustrates a format on a recording medium.
Figures 3, 4:
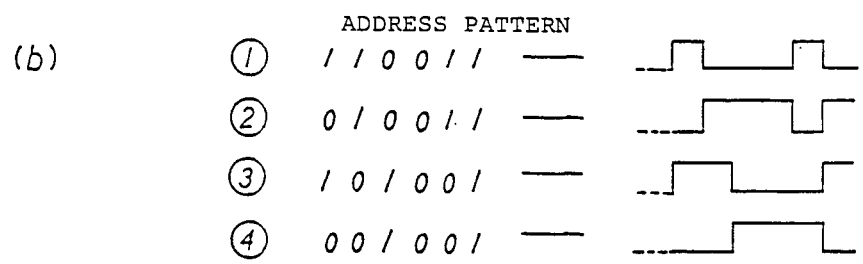
FIGS. 3(a) and (b) and 4 show bit patterns of sync signals.

Suppose now that a recording medium processed by the NRZI modulation system of Code Tables 1 and 2 is formated as shown in FIG. 2. The SYNC signal in FIG. 2 is composed generally of several bytes, and in this example the sync signal is composed of 6 bytes (60 code bits) which are divided into four marks each having 15 code bits. The code bits are defined as post-modulation bits. The 15 code bits are divided into a sync pattern of 9 code bits and an address pattern of 6 code bits. The sync pattern of 9 code bits is shown in FIG. 3 (a) which is not generated in the code data. Meanwhile the address pattern of 6 code bits represents the ordinal number in storage for the corresponding mark. If any address pattern becomes equal to some other address pattern due to an error, a sync pulse exactly coincident with the top of the data 12 is impossible to generate. Therefore, in forming four address patterns each composed fixedly of 6 code bits, a basic pattern ① in FIG. 3(b) is initially defined as a first address pattern. In this case, the basic pattern is formed so that a pattern of 4T is not included for the purpose of attaining an easy distinction from the sync pattern. A second address pattern is denoted by ② which is an inversion of the NRZI waveform of the previous pattern ①. In a third address pattern ③, three code bits are inverted with respect to the waveform of ① or ② while the remaining three code bits have the same waveform. A fourth address pattern ④ has an inverted waveform with respect to the pattern ③.

In a detection performed by NRZ (non-return to zero) system, each of the address patterns selected cannot become the same as any other address patterns unless errors occur in at least three code bits.

FIG. 4 shows marks formed by combining the aforementioned sync pattern (100010001) with the above four address patterns. The marks I–IV correspond to a SYNC signal and are continuously written in a recording mode with VFO SYNC 10 as shown in FIG. 2(b).

Figure 1:
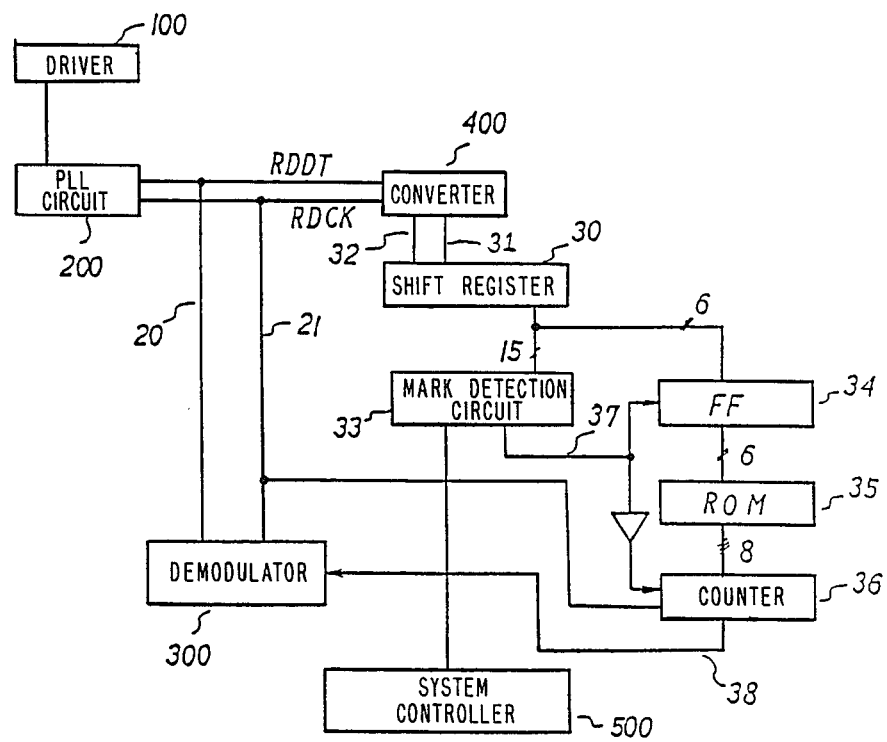
FIG. 1 is a block diagram of a sync signal detection apparatus for an embodiment of the present invention.

FIG. 1 is a schemtic block diagram of an apparatus for reproducing the signals recorded as described above.

In FIG. 1, the VFO SYNC 10 is read out by a driver 100 which performs a recording/reproducing operation. The read out data is synchronized by a PLL circuit 200, which outputs read data RDDT 20 (VFO SYNC, SYNC, DATA and so forth) and a read clock RDCK 21 that is used for reading out the data RDDT 20. The read data RDDT 20 and the read clock RDCK 21 are fed to a demodulator 300 and a converter 400, respectively. The read data RDDT 20 inputted to the converter 400 is converted from the NRZI signal into an NRZ (non-return to zero) signal. Read data 31 is obtained by converting the read data RDDT2D into the NRZ signal and is changed to a parallel data by a shift register 30. The parallel data of 15 high-order code bits included in the SYNC signal are introduced to a mark detection circuit 33, and the data of 6 low-order code bits is introduced to a flip-flop FF 34. In the mark detection circuit 33, a check for determining the coincidence of mark patterns is executed with respect to every 15 code bits, and a detection pulse 37 is outputted when a predetermined number (one in this example) of marks is detected. The detected marks are counted and the results is outputted to a system controller 500. Meanwhile in response to the detection pulse 37, the flip-flop FF 34 latches the input data (address pattern) and feeds the input data to a ROM 35.

In the cases when the address pattern ② is inputted to the ROM 35, "30" which corresponds to the entire amount of bits for the remaining marks III and IV is outputted in parallel from the ROM 35 and is fed to a counter circuit 36. The counter circuit 36 is reset by an inverted pulse of the detection pulse 37 starts counting the number of RDCK 21 inputted from the ROM 35 thereafter for operating a sync pulse 38. This sync pulse 38 represents the top of the data 12 and resets the demodulation circuit 300, so that the demodulation circuit 300 is thereby rendered ready for proper demodulation of the data 12.

When executing a read check immediately after writing, the sync signal recorded in the sector is determined to be erroneous by the system controller 500 in accordance with the result of counting the output of the mark detection circuit 33. In the case when the recorded sync signal is determined to be erroneous, recording is performed in the other sector. Thus, the reliability of the sync signal detection can be enhanced with respect to any induced error as well.

In the embodiment of the present invention, as described hereinabove, the sync signal is divided into a plurality of marks, each mark is further divided into a sync pattern and an address pattern and the signal is recorded. In case any error occurs in the sync signal at the time of detection, an accurate sync pulse can still be produced when more than a predetermined number of marks are detected. Although a description for NRZI modulation has been given in the above embodiment, the same effect is attainable by other modulations as well. It is to be understood that the aforementioned is merely illustrative with regard to the number of sync signal bytes, the number of divisions thereof, and the numbers of bits for an address pattern and a sync pattern. In particular, more precise sync pulses can be produced by increasing the number of division for sync patterns and the number of bits for address patterns.

As is obvious from the description given above, the present invention is capable of ensuring accurate synchronization for reproduced data having a smaller number of bits, so that a further enhancement of the data reliability may be realized.

While only certain embodiments of the present invention have been described, it will be apparent to those skilled in the art that various changes and modifications may be made therein without departing from the spirit and scope of the present invention as claimed.

What is claimed is:

1. A sync signal detection apparatus for detecting a sync signal indicating the top of recorded data, the sync signal being divided into a plurality of unique marks and each of the plurality of marks being divided into a sync pattern and an address pattern, comprising:
   means for sequentially detecting the sync and address patterns for each of the plurality of marks during a reproduction mode; and
   means for generating a sync pulse at the top of the recorded data corresponding to the address pattern for said marks in response to a predetermined number of marks being detected by said means for sequentially detecting.

2. The detection apparatus as defined in claim 1, wherein said sync signal is recorded in a non-return to zero inverted system.

3. A sync signal detection apparatus for detecting a sync signal for indicating the top of recorded data comprising:
   driver means for reading a recorded data signal;
   synchronization means for synchronizing said recorded data signal and developing a read data non-return to zero inverted (NRZI) signal and a read clock signal;
   conversion means for converting said read data NRZI signal to a read data non-return to zero (NRZ) signal;
   detecting means for detecting bits of said read data NRZ signal and generating a detection pulse in response to detecting a predetermined number of bits; and
   counting means for detecting said read clock signal after the generation of said detection pulse and generating the sync signal representative of the top of the recorded data.

* * * * *